United States Patent [19]

Acar

[11] 4,050,477
[45] Sept. 27, 1977

[54] VALVE

[75] Inventor: Ali Acar, Los Angeles, Calif.

[73] Assignee: International Telephone and Telegraph Corporation, New York, N.Y.

[21] Appl. No.: 627,479

[22] Filed: Oct. 31, 1975

[51] Int. Cl.² ........................................... F15B 13/044
[52] U.S. Cl. ............................................... 137/625.65
[58] Field of Search ................................... 137/625.65

[56] References Cited

U.S. PATENT DOCUMENTS

| 2,821,997 | 2/1958 | Clay et al. | 137/596.17 |
| 3,231,002 | 1/1966 | Lehrer | 137/487.5 X |
| 3,254,675 | 6/1966 | Johnson | 137/625.65 |
| 3,291,003 | 12/1963 | Lunenschloss et al. | 137/625.65 X |
| 3,307,824 | 3/1967 | Weisheit | 137/487.5 X |
| 3,395,890 | 8/1968 | Eckert et al. | 137/625.65 X |
| 3,451,429 | 6/1969 | Vick | 137/625.65 |
| 3,531,080 | 9/1970 | Dillon | 251/129 |
| 3,611,878 | 10/1971 | Puster | 137/625.65 X |
| 3,643,699 | 2/1972 | Mason | 137/625.65 X |
| 3,661,183 | 5/1972 | Komaroff et al. | 137/625.65 |
| 3,738,387 | 6/1973 | Ingram et al. | 137/625.65 |
| 3,800,832 | 4/1974 | Umphenour et al. | 137/625.65 |

FOREIGN PATENT DOCUMENTS

| 2,046,153 | 3/1972 | Germany | 137/625.65 |
| 2,124,484 | 11/1972 | Germany | 137/625.65 |
| 827,086 | 2/1960 | United Kingdom | 137/625.65 |
| 842,238 | 7/1960 | United Kingdom | 137/625.65 |

*Primary Examiner*—Alan Cohan
*Assistant Examiner*—Gerald A. Michalsky
*Attorney, Agent, or Firm*—A. Donald Stolzy

[57] ABSTRACT

A valve including a ball vibrated by a solenoid operated spring biased plunger wherein the ball is moved against one end of each of inlet and exhaust ports alternately in a somewhat oversized cavity to control, for example, the pressures on respective opposite sides of a displacement adjustable piston connected from the inlet port and cavity. The stroke of the piston may be made adjustable, if desired. The solenoid is energized with an A.C. source that has an adjustable frequency. An outstanding feature resides in the use of a needle valve at the other end of the inlet port. Tayloring can thereby be performed, whereas the same had not been otherwise possible in the prior art.

7 Claims, 5 Drawing Figures

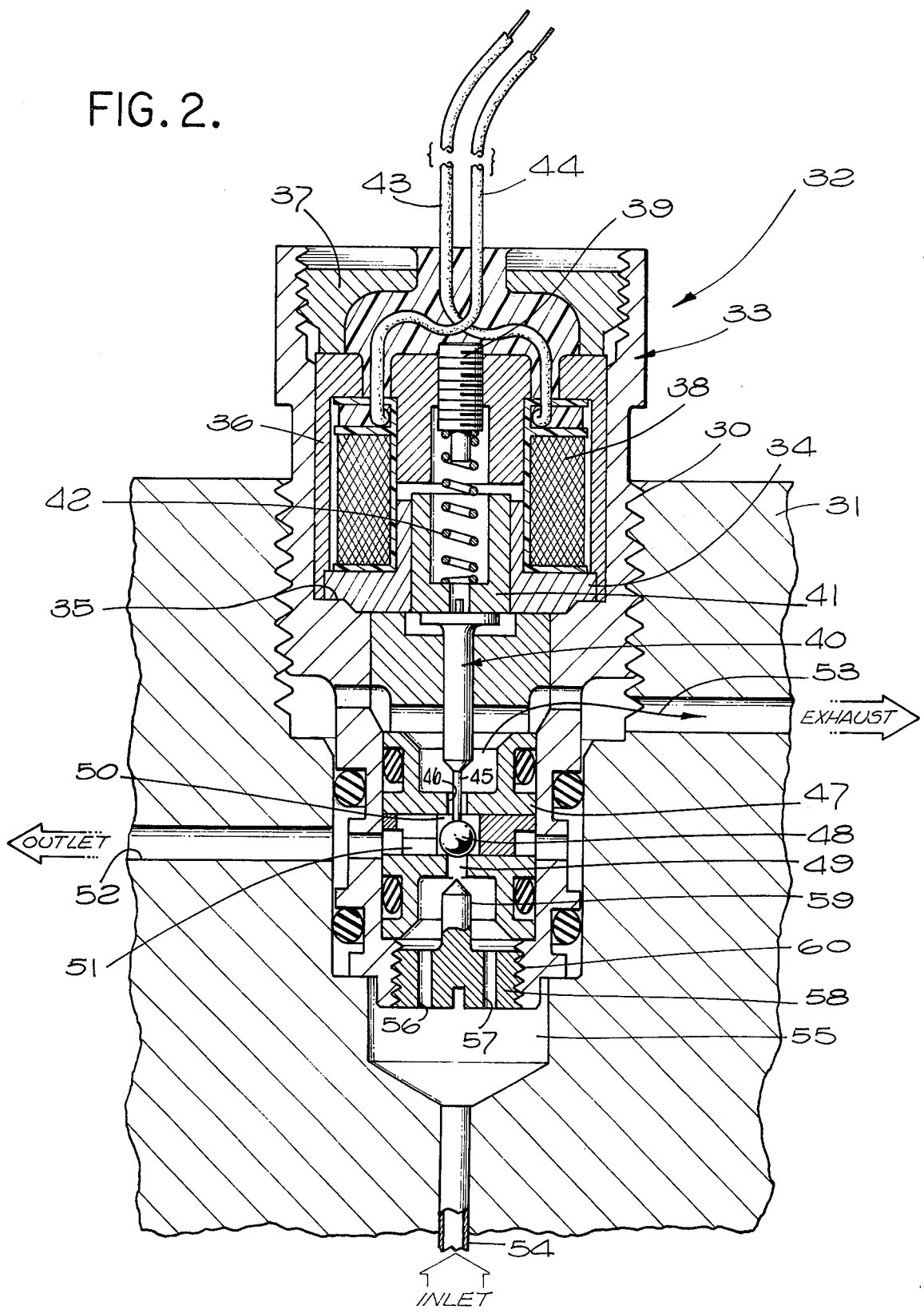

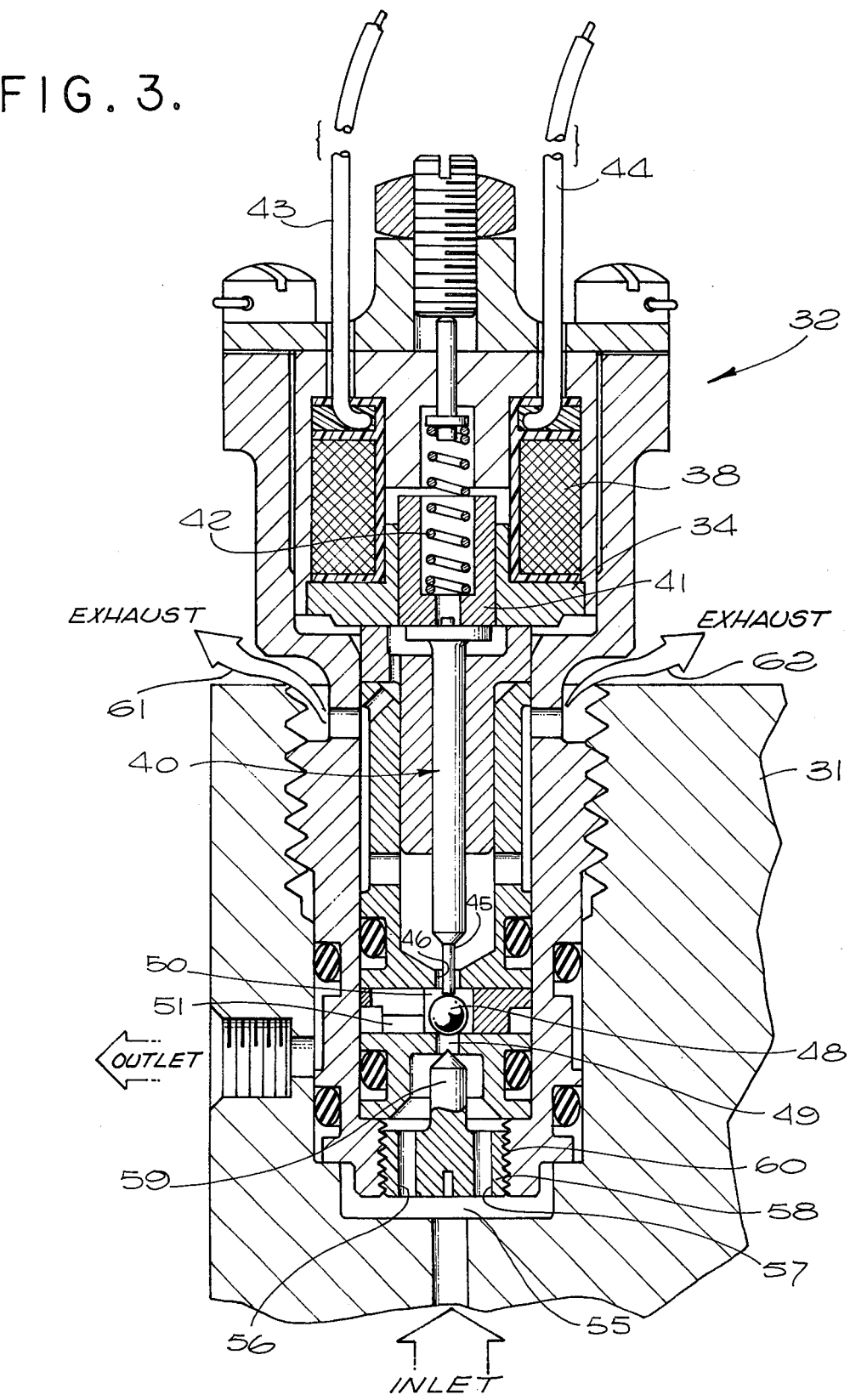

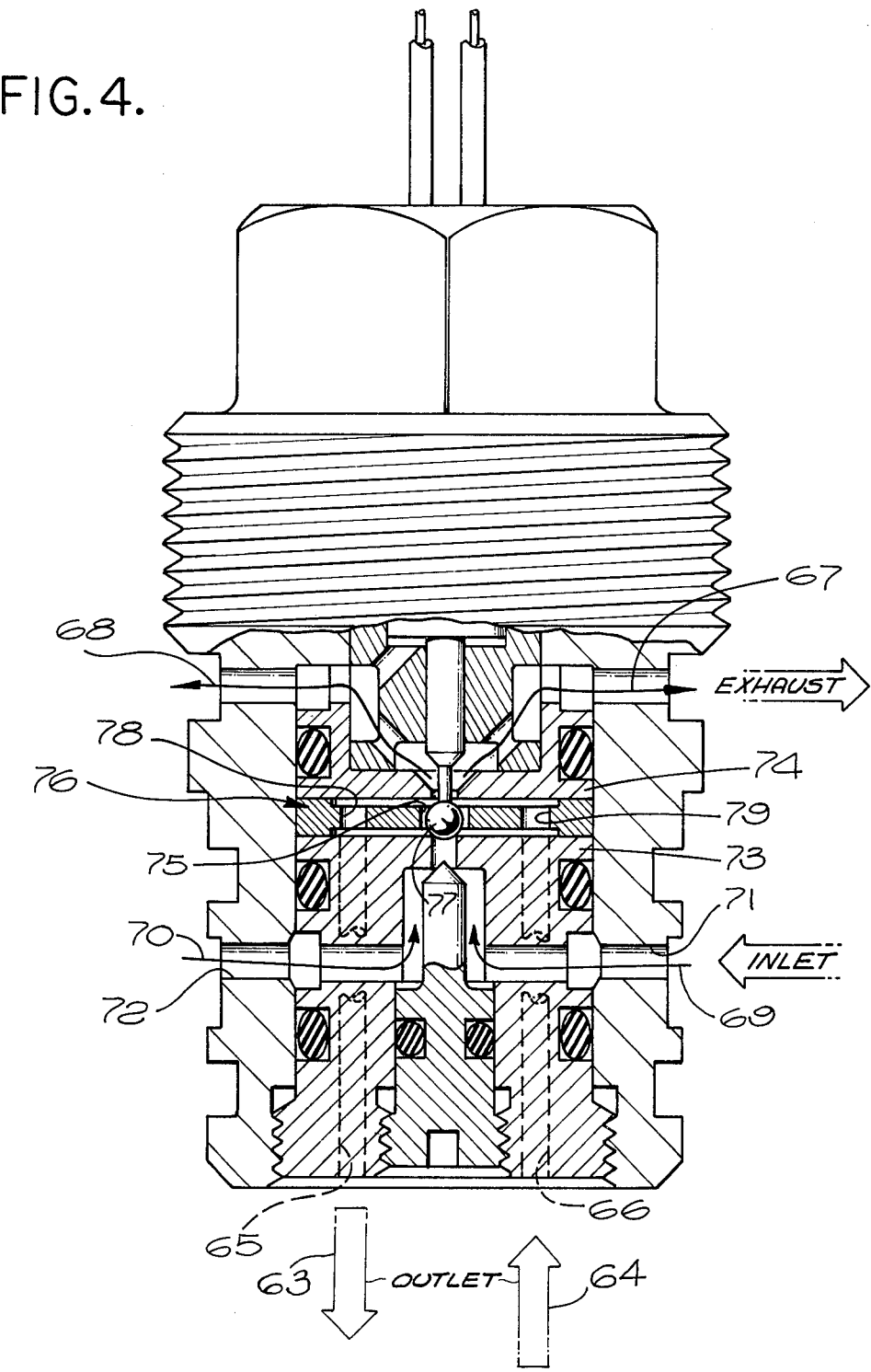

VALVE

BACKGROUND OF THE INVENTION

This invention relates to control valves or the like, and more particularly to a valve having a ball that is vibrated between inlet and exhaust ports to provide an outlet and/or inlet pressures to operate pressure responsive devices.

In the past, the same or different valves of the type just described have been difficult to manufacture accurately to specifications.

SUMMARY OF THE INVENTION

In accordance with the valve of the present invention, the above-described and other disadvantages of the prior art are overcome by providing a needle valve for the inlet port of a three-way valve.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 2 is a vertical sectional view through the valve of the present invention;

FIG. 3 is a vertical sectional view through an alternative embodiment of the present invention;

FIG. 4 is a vertical sectional view of still another alternative embodiment of the present invention.

DESCRIPTION OF THE PREFERRED EMBODIMENTS

Figure 1:
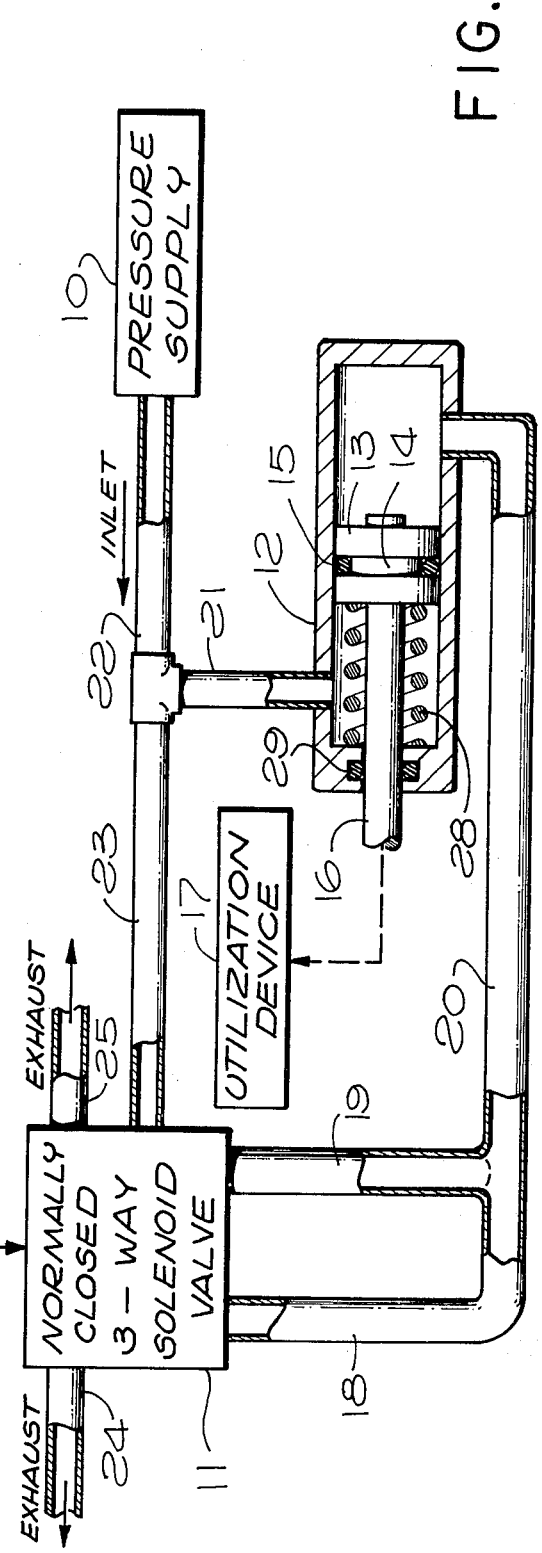
FIG. 1 is a schematic diagram of a system in which the valve of the present invention may be employed.

In FIG. 1, air, for example, under pressure is provided by a pressure supply 10 which is connected to a normally closed three-way solenoid valve 11 and to a cylinder 12. A piston 13 is provided in cylinder 12 having a groove 14 to carry an O-ring 15 that is trapped therein by cylinder 12. Piston 13 has a rod 16 fixed thereto which is connected to a utilization device 17 which may be any type of mechanically operated device in an aircraft or otherwise. A pair of inlet conduits 18 and 19 are connected from a header 20 to valve 11. Only one such conduit need be employed with two embodiments of the valve 11 disclosed hereinafter. Header 20 is connected with cylinder 12 on a side of piston 13 opposite the side upon which a conduit 21 is connected, conduit 21 being internally in communication with conduits 22 and 23, conduit 22 being connected from supply 10, conduit 23 being connected to valve 11.

Two exhaust conduits 24 and 25 are provided, only one of which may be necessary.

As will be explained, valve 11 operates, perhaps, in a rapid fashion by the energization of a solenoid with a variable voltage from a variable frequency source 26. The frequency of the said voltage is controlled by, for example, a manual adjustment of a controller 27.

In accordance with the foregoing, controller 27 is connected to source 26. Source 26, in turn, is then connected to the solenoid of valve 11.

Piston 13 is biased to the right, as viewed in FIG. 1, by a spring 28 which bears thereagainst and against the left end of cylinder 12. An O-ring 29 provides a seal between cylinder 12 and piston rod 16.

One embodiment of valve 11 is shown in FIG. 2 threaded at 30 into a body 31. The valve in FIG. 2 is indicated at 32. Valve 32 has a body 33. A ferrule 34 is held tightly against a shoulder 35 in body 33 by a cylinder 36 against which a ring 37 bears. Ring 37 is threaded into body 33. Cylinder 36 also holds a solenoid 38 in a fixed position inside body 33. A set screw 39 determines the stroke of a push pin 40 fixed to a plunger 41. A spring 42 is positioned between the bottom of plunger 41 and screw 39. Leads 43 and 44 are provided to solenoid 38. Push pin 40 has an end portion 45 which projects through an exhaust port 46 in still another body 47 fixed relative to body 31. The outside diameter of portion 45 is less than the inside diameter of exhaust port 46.

The extreme lower end of portion 45 bears upon a spherical ball 48 which, in the position shown, covers the upper end of an inlet port 49.

Ball 48 is loosely trapped in a cavity 50 which has a slot at 51 to allow the exit of the valve fluid through an outlet port 52.

Valve fluid flowing upwardly through exhaust port 46 flows in a direction indicated by an arrow 53.

Inlet pressure is provided through a conduit 54 into a chamber 55 through holes 56 and 57 in a plug 58. Plug 58 carries the needle 59 of a needle valve which can be adjusted by screwing the plug at 60 into body 33 to whatever extent is desirable or necessary. The upper end of needle 59 thus can open or close the lower end of inlet port 49 to any extent desired.

OPERATION

In the operation of the valve 32 shown in FIG. 2, controller 27 in FIG. 1 is set so as to provide a voltage of an appropriate frequency at the output of source 26.

In FIG. 2, solenoid 38 is then energized periodically, and portion 45 of push pin 40 is lifted by the operation of solenoid 38, and is returned by the operation of spring 42. Ball 48 then rises and falls at the frequency at which solenoid 38 is energized. Inlet pressure will move the ball 48 when solenoid 38 is energized. This allows small portions of the valve fluid to enter outlet 52 or to exhaust in the direction of arrow 53 periodically. If ball 48 is allowed to close off entirely the exhaust port 46, all the inlet fluid is then directed to outlet 52. If the ball 48 completely seals off the upper end of inlet port 49, fluid can flow to the right, as viewed in FIG. 2, through outlet 52 and outwardly in the direction of the exhaust as indicated by arrow 53.

The ball 48 may completely close off, in its course of travel upwardly and downwardly, inlet port 46 and exhaust port 49 alternately. However, ball 48 need not close off completely either one of the inlet and exhaust ports 49 and 46.

It is an outstanding feature of the present invention that the needle 59 of the needle valve can be employed to adjust the lower opening of inlet port 49 for different models of the same or different valves, and to make the manufacture of the same valve reliable. That is, the adjustment of the needle 59 makes it possible to make two valves operate in an identical fashion, whereas this was not possible in the prior art.

In FIG. 3, an alternative embodiment of the present invention is shown. The embodiment of FIG. 3 is little different from the embodiment of FIG. 2, having only exhaust locations at arrows 61 and 62 somewhat different than those illustrated in FIG. 2.

Still another embodiment of the invention is illustrated in FIG. 4 where a body similar to body 31 in FIG. 2 has been omitted. Only the true valve portion is shown in FIG. 4. Outlets indicated by arrows 63 and 64 do not mean that the valve fluid flows in opposite directions in the corresponding passageways 65 and 66, respectively. The opposite direction of arrows 63 and 64 mean only that fluid can flow in either direction in either one of the passageways 65 and 66. They are the outlet passages. Note will be taken in FIG. 2 that the valve fluid can flow in either direction in valve outlet passage 52.

In FIG. 4, valve exhaust fluid flows in the directions of arrows 67 and 68. Inlet fluid flows in the direction of arrows 69 and 70. It is not necessary to have an inlet on both sides of the valve. One of the inlet openings at 71 or 72 may thus be plugged.

In FIG. 4, walls of disks 73 and 74, and a bore 75 of a plate 76 carry a ball 77. Passageways 65 and 66 communicate with bores 78 and 79 of plate 76. Passageways 65 and 66 are dotted to indicate that they do not interfere with inlet openings 71 and 72 or other passageways within the valve body. In the view taken, bores 78 and 79 would not be shown. However, they are shown merely to illustrate that they exist and that there is communication between them and passageways 65 and 66, respectively.

Figure 5:
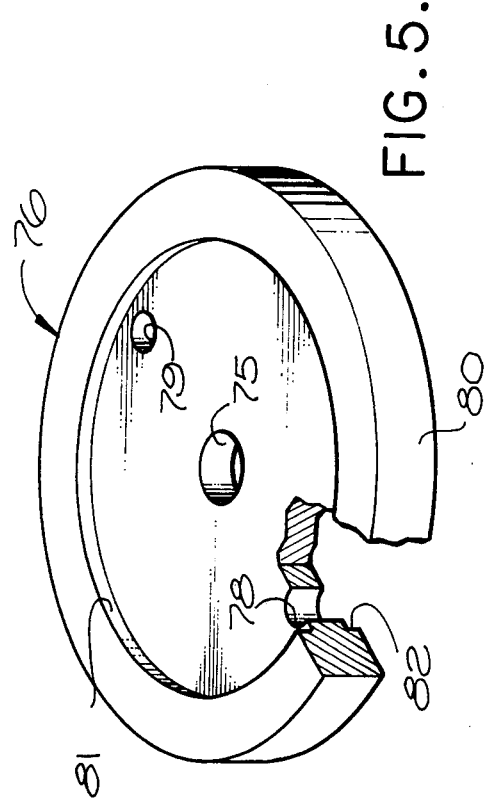
FIG. 5 is a broken away perspective view of a disk employed in the embodiment of FIG. 4.

Plate 76 is shown in a perspective view, partly broken away, in FIG. 5, including a rim portion 80 which is recessed at 81 and 82 on both sides thereof.

What is claimed is:

1. A three-way valve comprising: a body; a spherical ball; retaining means in said body slightly larger than said ball to trap the same in a confined space in said body, said retaining means having an inlet port, an outlet port, and an exhaust port; a solenoid mounted on said body; a ferromagnetic plunger slidable in said body; spring means to bias said plunger in one direction, said solenoid, when energized, pulling said plunger in a direction opposite said one direction, said plunger having a cross section smaller than that of said exhaust port and movable in spaced relation thereto therethrough to a position contiguous to said ball, said outlet port being in communication with said confined space, said ball being movable to a position substantially covering said inlet port, said body having a passage in communication with said inlet port; input means connected to said solenoid to energize the same cyclically; electrical control means connected to said input means to vary the frequency at which the same energizes said solenoid; utilization means connected with at least one of said ports; and restriction means adjustable on said body to vary the amount of fluid pressure in said inlet port.

2. The invention as defined in claim 1, wherein, when said solenoid is deenergized, said spring means biases said plunger against said ball, and, in turn, said ball in closing position over said inlet port, said body including mechanical means to adjust the stroke of said plunger.

3. The invention as defined in claim 2, wherein said restriction means includes a needle valve having a needle point to close said inlet port variable amounts, said restriction means having a portion threaded into said body and fixed relative to said needle valve in a manner to close or to open the same by turning said restriction means portion in the body thread.

4. The invention as defined in claim 1, wherein, when said solenoid is deenergized, said spring means biases said plunger against said ball and, in turn, said ball in closing position over said inlet port, said restriction means including a needle valve having a needle point to close said inlet port variable amounts, said restriction means having a portion threaded into said body and fixed relative to said needle valve in a manner to close or to open the same by turning said restriction means portion in the body thread.

5. The invention as defined in claim 1, wherein said body includes mechanical means to adjust the stroke of said plunger.

6. The invention as defined in claim 5, wherein said restriction means includes a needle valve having a needle point to close said inlet port variable amounts, said restriction means having a portion threaded into said body and fixed relative to said needle valve in a manner to close or to open the same by turning said restriction means portion in the body thread.

7. The invention as defined in claim 1, wherein said restriction means includes a needle valve having a needle point to close said inlet port variable amounts, said restriction means having a portion threaded into said body and fixed relative to said needle valve in a manner to close or to open the same by turning said restriction means portion in the body thread.

* * * * *